(12) United States Patent
Khanka et al.

(10) Patent No.: US 8,254,406 B1
(45) Date of Patent: Aug. 28, 2012

(54) EARLY TERMINATION IN WIRELESS COMMUNICATION OVERHEAD CYCLES

(75) Inventors: Bhagwan Singh Khanka, Lenexa, KS (US); Sachin R. Vargantwar, Overland Park, KS (US); Jasinder Pal Singh, Olathe, KS (US); Manoj Shetty, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 580 days.

(21) Appl. No.: 12/471,636

(22) Filed: May 26, 2009

(51) Int. Cl.
*H04J 3/26* (2006.01)
(52) U.S. Cl. ........................................ 370/432; 370/458
(58) Field of Classification Search .................. None
See application file for complete search history.

(56) References Cited

U.S. PATENT DOCUMENTS

| 5,802,465 | A | 9/1998 | Hamalainen et al. |
| 6,469,992 | B1 | 10/2002 | Schieder |
| 7,464,313 | B2 | 12/2008 | Smith et al. |
| 7,937,738 | B1* | 5/2011 | Gurantz ........................ 725/118 |
| 2003/0054820 | A1* | 3/2003 | Kang et al. .................... 455/434 |
| 2007/0189290 | A1* | 8/2007 | Bauer ............................ 370/390 |
| 2007/0211688 | A1* | 9/2007 | Park et al. ..................... 370/347 |
| 2009/0286497 | A1* | 11/2009 | Akkarakaran et al. ...... 455/226.3 |

* cited by examiner

Primary Examiner — Nittaya Juntima
Assistant Examiner — Khoa Huynh

(57) ABSTRACT

What is disclosed is a method of operating a wireless access node which exchanges overhead information with user devices in a series of repeating overhead time cycles each comprising a multi-user message and single-user messages. The method includes transmitting the multi-user messages for receipt and use by all of the user devices and transmitting the single-user messages for receipt and use by individual ones of the user devices. The method includes, in response to the single-user messages, receiving acknowledge messages comprising RF condition indicators for the single-user messages. The method includes, if any of the RF condition indicators are below a performance threshold, then suspending further transmission of the multi-user messages in the series of repeating overhead time cycles, and if none of the RF condition indicators are below the performance threshold, then continuing further transmission of the multi-user messages in the series of repeating overhead time cycles.

16 Claims, 6 Drawing Sheets

| WCD | SIGNAL-TO-NOISE RATIO |
|---|---|
| 310 | 40 |
| 311 | 60 |
| 312 | 34 |

TABLE 500

SNR THRESHOLD: 35

EARLY TERMINATION IN WIRELESS COMMUNICATION OVERHEAD CYCLES

TECHNICAL FIELD

Aspects of the disclosure are related to the field of communications, and in particular, wireless communication protocols in wireless communication networks.

TECHNICAL BACKGROUND

Wireless communication networks typically include wireless communication devices which, via a wireless communication system, communicate with further communication networks and equipment. The wireless communication system typically includes wireless access nodes and associated equipment to route user communications over wireless links from the wireless communication devices to further communication networks, equipment, and destinations.

In addition to user communications, the wireless access nodes are typically configured to transfer overhead information via overhead messaging cycles carried over control channels in the wireless links for use by the wireless communication devices. The overhead information is typically transferred in several overhead message types which carry designated overhead information. However, when many wireless communication devices are communicating with a wireless access node, the overhead messages can consume the limited resources of the wireless links.

OVERVIEW

What is disclosed is a method of operating a wireless access node, where the wireless access node exchanges overhead information with user devices in a series of repeating overhead time cycles, and where the overhead time cycles each comprise a multi-user message and a plurality of single-user messages. The method includes transmitting the multi-user messages for receipt and use by all of the user devices and transmitting the single-user messages for receipt and use by individual ones of the user devices. The method includes, in response to the single-user messages, receiving acknowledge messages and associated RF condition indicators for the acknowledge message transfer. The method includes, if any of the RF condition indicators are below a performance threshold, then suspending further transmission of the multi-user messages in the series of repeating overhead time cycles, and if none of the RF condition indicators are below the performance threshold, then continuing further transmission of the multi-user messages in the series of repeating overhead time cycles.

What is also disclosed is a wireless access node. The wireless access node includes a transceiver configured to exchange overhead information with user devices in a series of repeating overhead time cycles, where the overhead time cycles each comprise a multi-user message and a plurality of single-user messages. The transceiver is configured to transmit the multi-user messages for receipt and use by all of the user devices, and transmit the single-user messages for receipt and use by individual ones of the user devices. In response to the single-user messages, the transceiver is configured to transmit receive acknowledge messages and associated RF condition indicators for the acknowledge message transfer. The wireless access node also includes a processing system configured to process the RF condition indicators and the performance threshold. If any of the RF condition indicators are below a performance threshold, then the processing system is configured to command the transceiver to suspend further transmission of the multi-user messages in the series of repeating overhead time cycles. If none of the RF condition indicators are below the performance threshold, then the processing system is configured to command the transceiver to continue further transmission of the multi-user messages in the series of repeating overhead time cycles.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
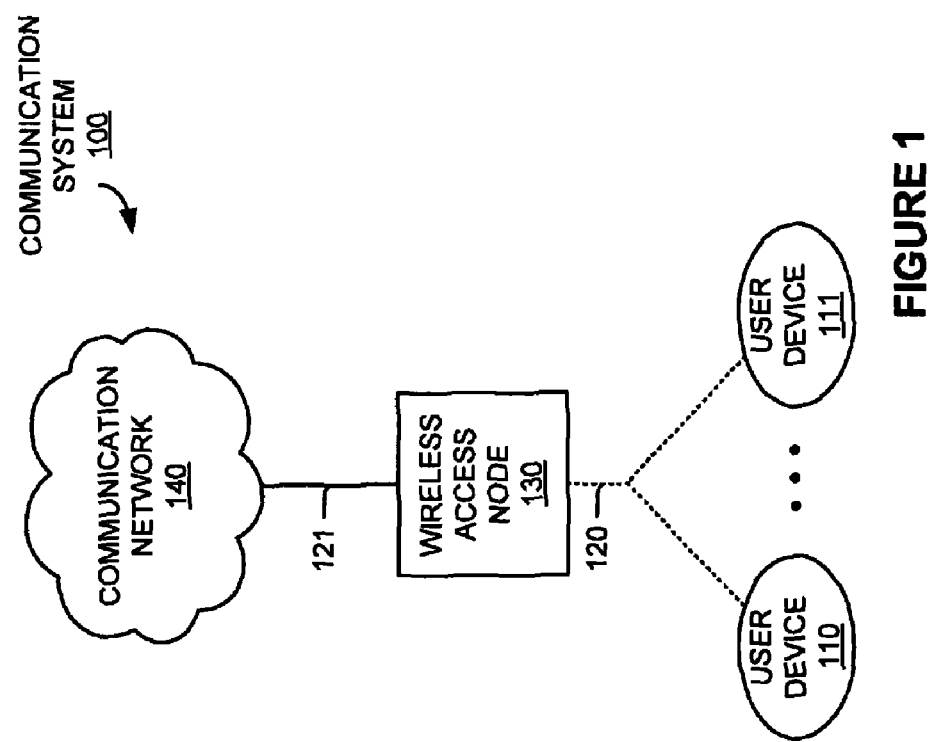
FIG. 1 is a system diagram illustrating a communication system.

FIG. 1 is a system diagram illustrating communication system 100. Communication system 100 includes user devices 110-111, wireless access node 130, and communication network 140. User devices 110-111 and wireless access node 130 communicate over wireless link 120. Wireless access node 130 and communication network 140 communicate over link 121.

In FIG. 1, wireless access node 130 is configured to exchange overhead information with user devices 110-111 in a series of repeating overhead time cycles, where the overhead time cycles each include multi-user messages and single-user messages. In the example in FIG. 1, the overhead information is transferred over wireless link 120, and can be received by user devices 110-111. Other examples of the overhead cycles are found in FIG. 6.

In typical examples, the multi-user messages are meant for all user devices in communication with wireless access node 130. The multi-user messages could contain network parameters, system parameters, or other information related to general operations of wireless access node 130. A single-user message, in typical examples, is meant for an individual user device in communication with wireless access node 130, and all user devices may possibly not have a single-user message transmitted thereto during a particular overhead cycle. Some single-user messages are based upon communication activity, network management functions, or other activity of wireless access node 130 or communication network 140, specifically directed towards an individual user device. Some examples of single-user messages include paging messages, call notifications, resource allocation messages for wireless link 120, or other information.

Additionally, radio-frequency (RF) condition information associated with a received single-user message could be transferred in response to the single-user message. RF condition indicators include information about wireless link 120 as detected by user devices. For example, a single-user message received by user device 110 could have particular RF conditions associated therewith, such as received signal strength, signal-to-noise conditions, or other RF condition information. In some examples, the RF condition information is transferred in an acknowledge message to a single-user message, while in other examples, the RF condition information is transferred separately. Although in typical examples, the RF condition indicator is associated with receipt of a single-user message, in other examples the RF condition indicator could be indicative of the present RF conditions of wireless link 120, the RF environment, or other RF conditions, as measured by a user device.

Figure 2:
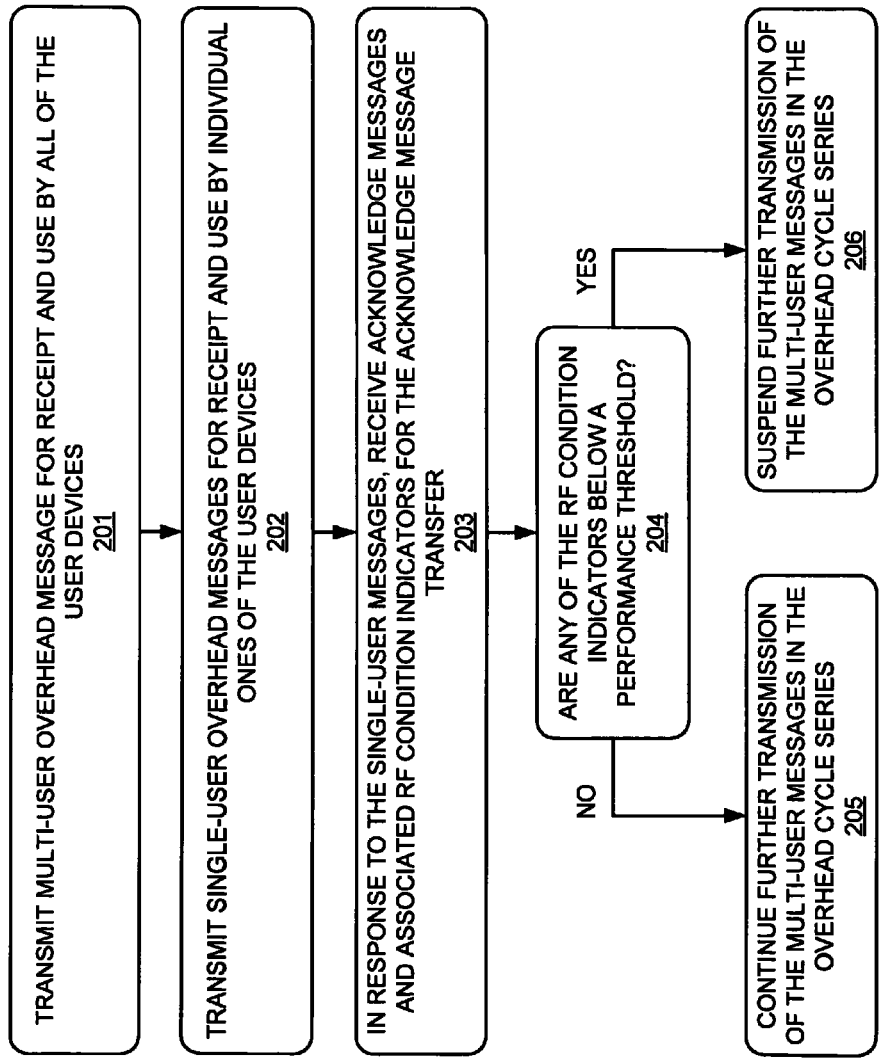
FIG. 2 is a flow diagram illustrating a method of operation of a communication system.

FIG. 2 is a flow diagram illustrating a method of operation of communication system 100, as shown in FIG. 1. The operations in FIG. 2 are referenced herein parenthetically. In FIG. 2, within the series of repeating overhead time cycles, wireless access node 130 transmits (201) multi-user messages for receipt and use by all user devices 110-111. Wireless access node 130 also transmits (202) single-user messages for receipt and use by individual ones of user devices 110-111.

In response to the single-user messages, wireless access node 130 receives (203) acknowledge messages and associated RF condition indicators for the acknowledge message transfer. In typical examples, the user devices determine an acknowledge message in response to a received single-user message, alerting wireless access node 130 of a successful receipt by the intended user device of the information contained within the single-user message. In some examples, the intended user device does not properly receive a single-user message, and thus an acknowledge message would not be received by wireless access node 130.

Wireless access node 130 determines (204) if any of the RF condition indicators associated with the acknowledge messages are below a performance threshold. If none of the RF condition indicators associated with the acknowledge messages are below the performance threshold, then wireless access node 130 continues (205) further transmission of the multi-user messages in the overhead cycle series.

However, if any of the RF condition indicators associated with the acknowledge messages are below the performance threshold, then wireless access node 130 suspends (206) further transmission of the multi-user messages in the overhead cycle series. In some examples, the transmission of the multi-user messages is suspended until a subsequent series of overhead time cycles. The transmission of the multi-user messages could be resumed in a subsequent series of overhead time cycles. In other examples, the transmission of the multi-user messages is suspended until new information is ready to be transferred by wireless access node 130 in a multi-user message. This new information could be the result of communication activity, network management functions, or other activity of wireless access node 130 or communication network 140.

Referring back to FIG. 1, user devices 110-111 each comprise radio frequency (RF) communication circuitry and an antenna. The RF communication circuitry typically includes amplifiers, filters, modulators, and signal processing circuitry. In many examples, user devices 110-111 each include equipment to receive and measure overhead communications from wireless access nodes, and acknowledge receipt of messages included in the overhead communications. User devices 110-111 may also each include a user interface, memory device, computer-readable storage medium, software, processing circuitry, or some other communication components. User devices 110-111 may each be a wireless communication device, telephone, computer, e-book, mobile Internet appliance, wireless network interface card, media player, game console, or some other wireless communication apparatus, including combinations thereof. Although two user devices are shown in FIG. 1, it should be understood that a different number of user devices could be in communication with wireless access node 130.

Wireless access node 130 comprises RF communication and control circuitry and an antenna. The RF communication circuitry typically includes amplifiers, filters, RF modulators, and signal processing circuitry. In many examples, wireless access node 130 includes equipment to wirelessly transmit multi-user and single-user messages in overhead communications to user devices, along with user communications. Wireless access node 130 may also comprise a router, server, memory device, software, processing circuitry, cabling, power supply, network communication interface, physical structural support, or some other communication apparatus. Wireless access node 130 could be a base station, base transceiver station, Internet access node, telephony service node, wireless data access point, or some other wireless communication system, including combinations thereof.

Communication network 140 comprises the core network of a wireless communications provider, and could include routers, gateways, telecommunication switches, processing systems, or other communications equipment and systems for providing communication and data services. Communication network 140 may also comprise optical networks, asynchronous transfer mode (ATM) networks, packet networks, metropolitan-area networks (MAN), or other network topologies, equipment, or systems, including combinations thereof.

Wireless link 120 uses the air or space as the transport media. Wireless link 120 may use various protocols, such as Code Division Multiple Access (CDMA), Evolution Data Optimized (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format, including combinations, improvements, or variations thereof. In FIG. 1, user devices 110-111 may communicate with wireless access node 130 over individual wireless links. However, in FIG. 1, a single wireless link 120 is shown for clarity.

Communication link 121 uses metal, glass, optical, air, space, or some other material as the transport media. Communication link 121 could use various communication protocols, such as Time Division Multiplex (TDM), asynchronous transfer mode (ATM), Internet Protocol (IP), Ethernet, synchronous optical networking (SONET), communication signaling, or some other communication format, including combinations, improvements, or variations thereof.

Communication links 120-121 may each include many different signals sharing the same link—as represented by the associated lines in FIG. 1—comprising access channels, forward links, reverse links, user communications, communication sessions, overhead communications, frequencies, timeslots, transportation ports, logical transportation links, network sockets, packets, or communication directions. Communication link 121 could be a direct link or may include intermediate networks, systems, or devices.

Figure 3:
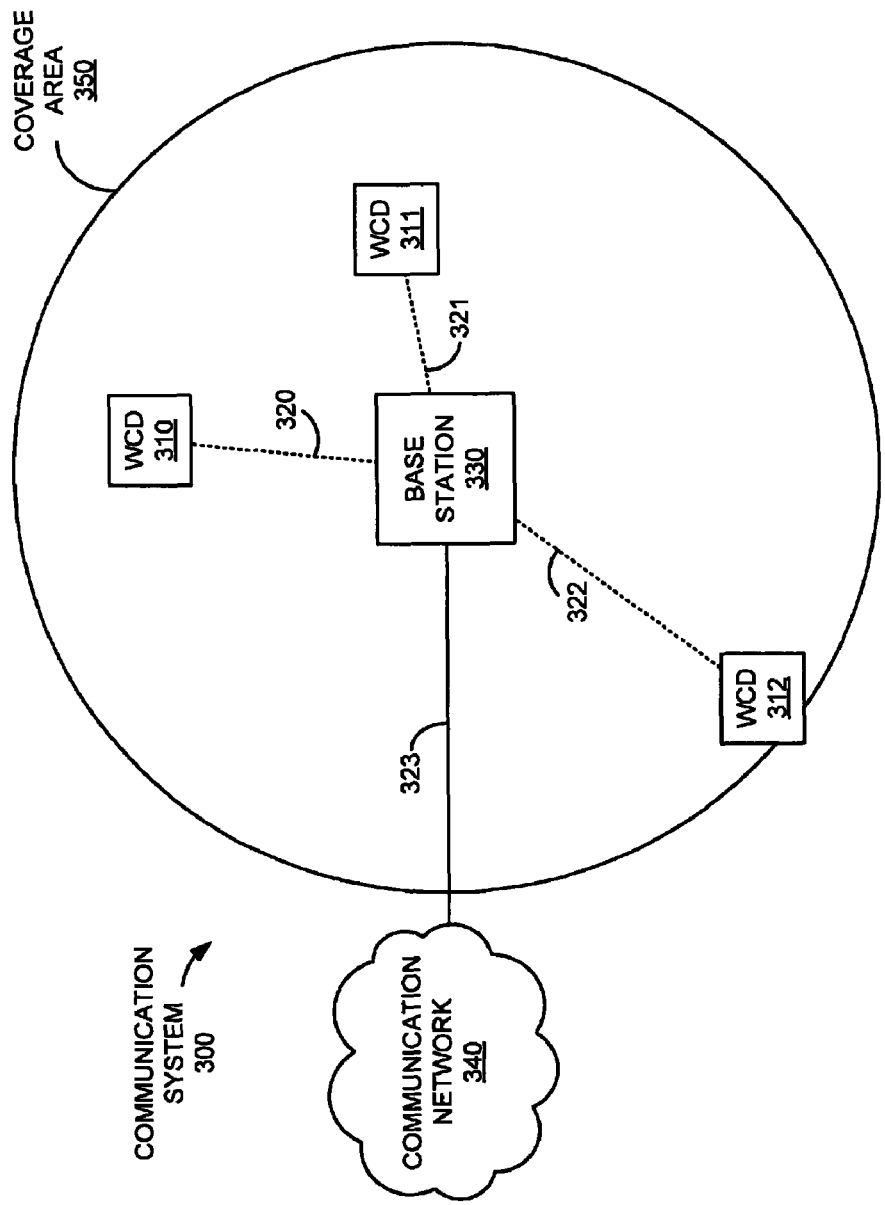
FIG. 3 is a system diagram illustrating a communication system.

FIG. 3 is a system diagram illustrating communication system 300. Communication system 300 includes wireless communication devices (WCD) 310-312, base station 330, and communication network 340. WCD 310-312 communicate with base station 330 over wireless links 320-322, respectively. Base station 330 and communication network 340 communicate over link 323.

WCD 310-312 are user devices, and comprise mobile wireless telephones in this example. Base station 330 includes wireless communications equipment capable of communicating with and providing communication service to wireless communication devices. Communication network 340 is a core network of a wireless communication provider in this example. Communication network 340 could include further base stations, routers, gateways, controller systems, processing systems, or other communication equipment. Wireless links 320-322 employ the CDMA wireless protocol, and link 323 is a T1 link in this example.

As shown in FIG. 3, base station 330 has a limited geographic range over which it can provide communication services to wireless communication devices. The limited range over which base station 330 can support communications with wireless communication devices is indicated by the circular-shaped coverage area 350 in FIG. 3. Although a circular region defining coverage area 350 is shown in FIG. 3, it should be understood that the coverage area could be of other shapes and configurations, as determined by geographic features, empirical data, the equipment of base station 330, or by other factors, including combinations thereof.

Base station 330 is configured to exchange overhead information with wireless communication devices (WCD) 310-312 in a series of repeating overhead time cycles, where the overhead time cycles each include multi-user messages and single-user messages. In this example, the multi-user messages could include access parameter messages (APM) and system parameter messages (SPM), and the single-user messages could include extended channel assignment messages (ECAM) and paging messages. It should be understood that in other examples, such as other wireless communication protocols, different message types may be included.

Also in the example shown in FIG. 3, the overhead information is transferred in a control channel portion of a code-division multiple access (CDMA) forward link between base station 330 and WCD 310-312. In typical examples, a forward link describes communications transmitted by a base station for receipt and use by user devices, while a reverse link describes communications transmitted by a user device for receipt and use by a base station. In FIG. 3, the overhead information is transferred over wireless links 320-322, and the overhead information could be broadcast for receipt over all wireless links 320-322. Other examples of the overhead cycles are found in FIG. 6.

Figure 4:
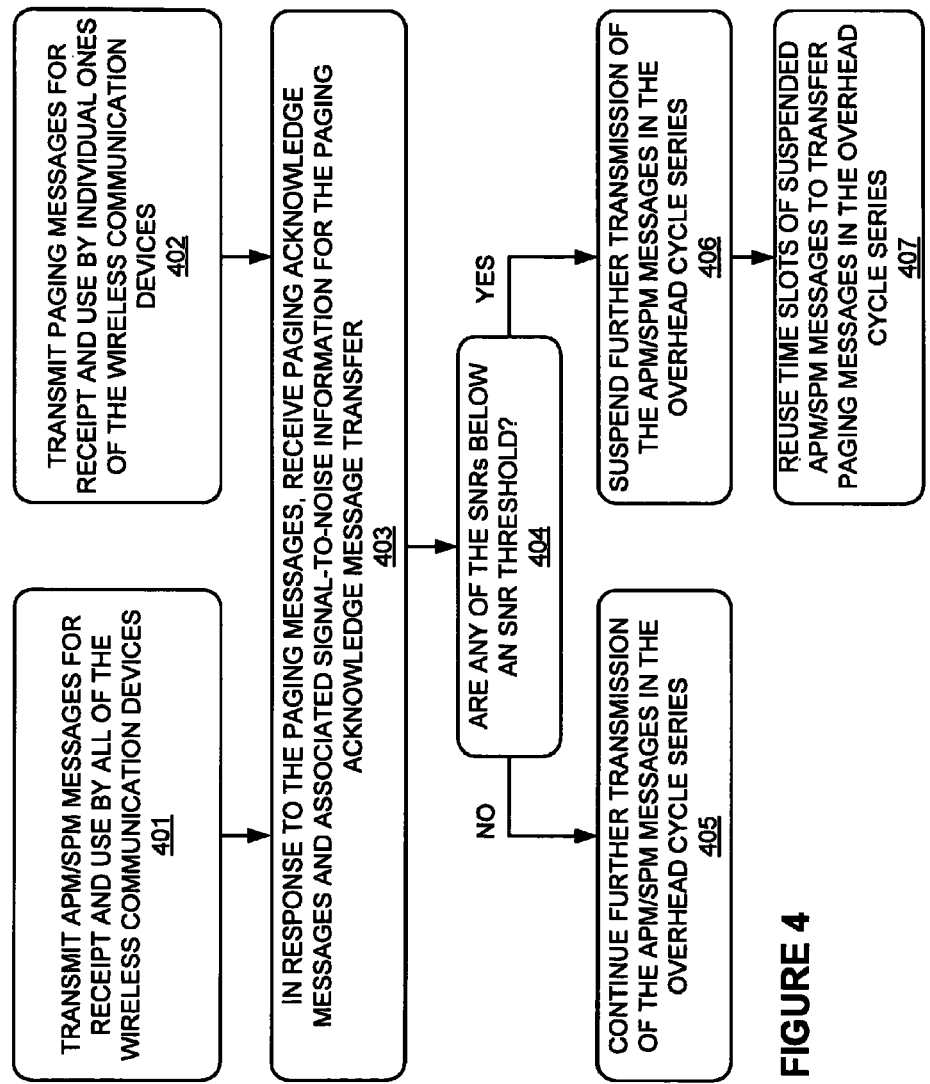
FIG. 4 is a flow diagram illustrating a method of operation of a communication system.

FIG. 4 is a flow diagram illustrating a method of operation of communication system 300, as shown in FIG. 3. The operations in FIG. 4 are referenced herein parenthetically. In FIG. 4, within a series of repeating overhead time cycles, base station 330 transmits (401) APM and SPM messages for receipt and use by all WCD 310-312. Base station 330 also transmits (402) paging messages for receipt and use by individual ones of WCD 310-312. The APM and SPM messages include network parameters, system parameters, or other information related to general operations of wireless access node 130. A paging message is meant for an individual WCD in communication with base station 330, and could include call notifications, text messages, audio messages, network notifications, or other information.

In response to the paging messages, base station 330 receives (403) paging acknowledge messages and associated signal-to-noise ratio (SNR) information for the paging acknowledge message transfer. In typical examples, the WCDs determine a paging acknowledge message in response to a received paging message, alerting base station 330 of a successful receipt by the intended WCD of the information contained within the paging message. In some examples, the intended WCD does not properly receive a paging message, and thus a paging acknowledge message would not be received by base station 330. The SNR information includes RF quality information, such as signal-to-noise ratios, about the wireless links over which the paging messages are received, as detected by the associated WCD.

Base station 330 determines (404) if any of the SNRs associated with the paging acknowledge messages are below a SNR threshold. If none of the SNRs associated with the paging acknowledge messages are below the SNR threshold, then base station 330 continues (405) further transmission of the APM/SPM messages in the overhead cycle series.

However, if any of the SNRs associated with the paging acknowledge messages are below the SNR threshold, then base station 330 suspends or terminates (406) further transmission of the APM/SPM messages in the overhead cycle series. In this example, the transmission of the APM/SPM messages could be resumed in a subsequent series of overhead time cycles.

Figure 6:
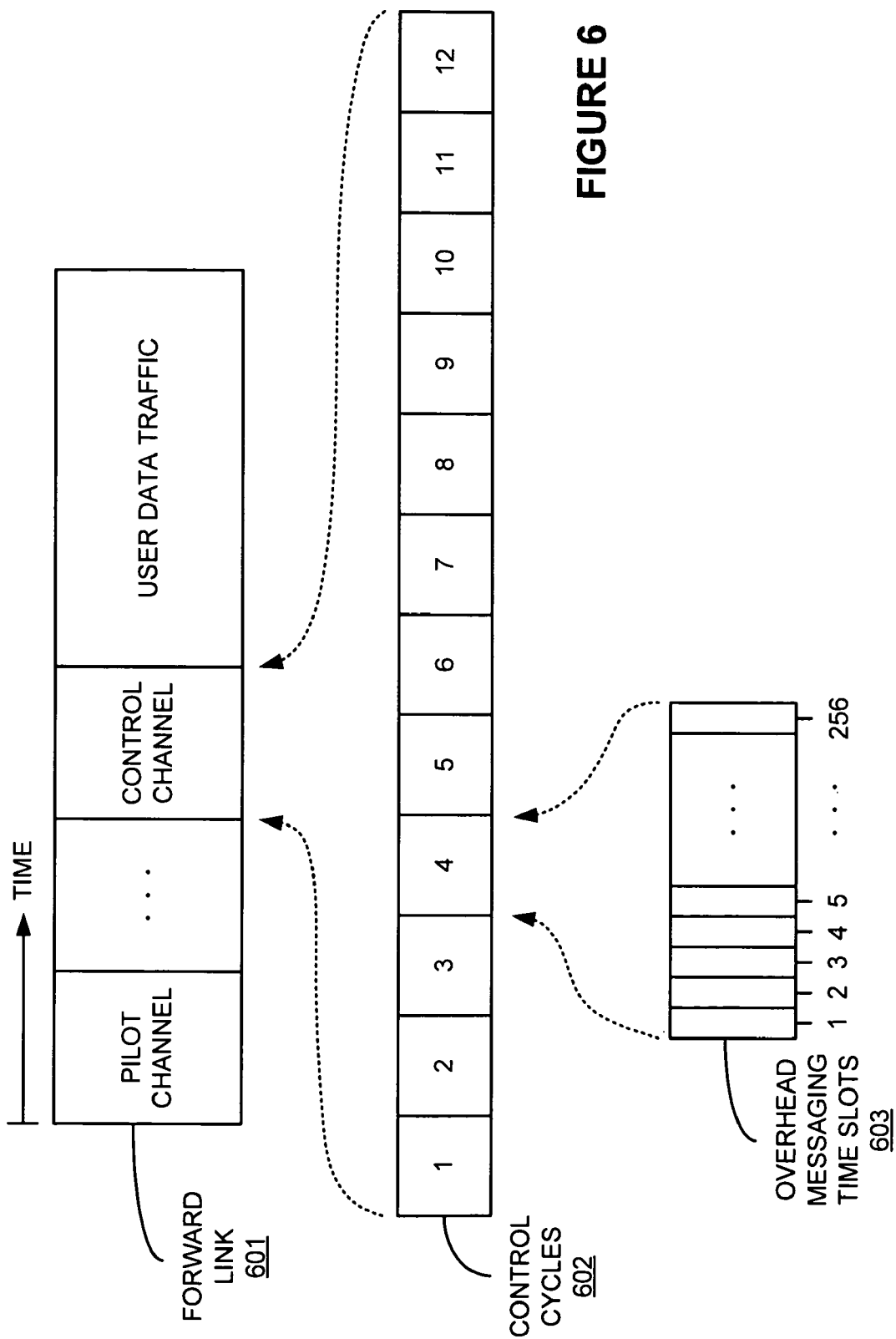
FIG. 6 is a diagram illustrating a forward link in a wireless communication system.

If received SNR information indicates that a WCD experiencing a low signal-to-noise ratio for the overhead communications has received and acknowledged a paging message, base station 330 could assume that all WCDs, or a sufficient portion of WCDs, have also successfully received the APM/SPM messages in the series of repeating overhead time cycles. In typical examples, when a WCD receives an APM/SPM message, the WCD does not transfer an acknowledge message for the APM/SPM message. Thus, base station 330 may not know if the APM/SPM messages are successfully received by WCDs, and will repeatedly transfer the APM/SPM messages to ensure all WCDs have an opportunity for receipt of the APM/SPM messages. This repeated transfer of the APM/SPM messages in the series of repeating overhead time cycles uses limited resources and bandwidth in the overhead communications of the forward link control channel. As shown in FIG. 6, the paging messages and APM/SPM messages could be transferred in the overhead messaging time slots 603. If time slots are freed up to transfer paging messages, or other messages, rather than repetitive APM/SPM messages, better use of the limited resources of the control cycles 602 can be achieved. Further details on the overhead messaging time slots can be found in the discussion regarding FIG. 6.

Base station 330 thus reuses (407) time slots of the suspended APM/SPM messages in the overhead cycle series. In many examples, the resources of the suspended APM/SPM messages are reused for other overhead communications, such as paging messages or other single-user messages.

Figure 5:
FIG. 5 shows a table illustrating example RF condition indicators.

FIG. 5 shows table 500 illustrating example RF condition indicators for WCD 310-312. Table 500 includes a first column indicating the WCD, and a second column indicating a SNR associated with received paging messages. In this example, the RF condition indicators are signal-to-noise ratios. Also, the performance threshold in this example is a signal-to-noise ratio (SNR) threshold of 35. It should be understood that the units and magnitudes of the signal-to-noise ratios in this example are merely exemplary.

In this example, each of WCD 310-312 has received individual single-user messages, such as paging messages, and detected a SNR of the received single-user messages. WCD 310 detects a SNR of 40, WCD 311 detects a SNR of 60, and WCD 312 detects a SNR of 34 for the single-user message each WCD receives. Since the SNR threshold in this example is 35, then base station 330 will determine that WCD 312 with the SNR of 34 is below the SNR threshold. Thus, base station 330 suspends further transmission of the multi-user messages in the overhead cycle series.

As shown in FIG. 3, the distance and location of each WCD 310-312 will vary throughout coverage are 350, and the associated SNR of overhead messages received from base station 330 in each of WCD 310-312 could also vary. Advantageously, when a WCD experiencing a SNR below a SNR threshold, such as shown for WCD 312 in table 500, subsequently acknowledges successful receipt of a paging message, then base station 330 can assume that all WCDs have also received the APM/SPM messages of the series of repeating overhead time cycles. Thus, resources and bandwidth in the overhead communications can be conserved and reused for other overhead communications when subsequent APM/SPM messages are discontinued in the series of repeating overhead time cycles. In some examples, since the APM/SPM messages are not discontinued until a WCD acknowledges a paging message with a corresponding SNR below the performance threshold, only a portion of the APM/SPM message resources in the series of repeating overhead time cycles is available for reuse for other communications. The other communications could be further paging messages, channel assignment messages, call notifications, or other communications and single-user messages.

FIG. 6 is a diagram illustrating an example of a forward link portion of wireless links 320-322, as found in FIG. 3, although wireless links 320-322 could use other configurations. Wireless link 120 could also incorporate features of the forward link described in FIG. 6, although wireless links 120 could use other configurations. FIG. 6 illustrates forward link 601, control cycles 602, and overhead messaging time slots 603.

Forward link 601 includes several time-wise portions, with time increasing to the right, as shown by the arrowhead above forward link 601. In forward link 601, a pilot channel, control channel, and user data traffic portion are shown, although other portions could also be in forward link 601. The forward link sequence is typically repeated continuously to effectuate communication service from base station 330 to WCD 310-312 over wireless links 320-322. In further examples, a reverse link of wireless links 320-322 could exist to facilitate communication service from WCD 310-312 to base station 330. Other examples of forward link 601 could include frequency-wise portions, or other configurations, including combinations thereof.

The pilot channel includes information related to base station 330 and the service provider of communication network 340 used in the registration process or network entry of each WCD 310-312. The user data traffic portion includes user communications, such as voice call data, web pages, email, among other information. The control channel includes information related to overhead information of wireless links 320-322 and overhead information of the associated communication services. The control channel could include broadcast portions applicable to all wireless communication devices in communication with base station 330, and portions specific to WCD 310-312 or other wireless communication devices. In some examples, this overhead information includes quick configuration messages, access parameter messages (APM), or system parameter messages (SPM). In other examples, the control cycles include paging messages or extended channel assignment messages (ECAM) for wireless communication devices. The paging messages could include call alerts, text messages, audio messages, network alerts, or other information.

In the example shown in FIG. 6, control cycles 602 includes 12 control cycles. Each of the control cycles are distinct, with possibly different content, in the control channel of forward link 601. Also, included in each control cycle 1-12 are overhead messaging time slots 603. In this example, 256 time slots are included in each control cycle 1-12. Each overhead messaging time slot 1-256 includes overhead information.

A wireless communication device could be assigned to a particular control cycle, and only the time slots within the assigned control cycle would then be monitored by the wireless communication device. Additionally, the individual time slots 1-256 for each control cycle 1-12 could also have information which allows a wireless communication device to determine if the time slot is relevant to the particular wireless communication device. In many examples, some time slots will be broadcast information applicable to many wireless communication devices, while in other cases, some time slots will be intended for a specific wireless communication device.

FIGS. 1-6 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless access node, wherein the wireless access node exchanges overhead information with user devices in a series of repeating overhead time cycles, and wherein the overhead time cycles each comprise a multi-user message and a plurality of single-user messages, the method comprising:

transmitting the multi-user messages comprising network parameters for receipt and use by all of the user devices;

transmitting the single-user messages comprising paging messages for receipt and use by individual ones of the user devices;

in response to the single-user messages, receiving acknowledge messages comprising RF condition indicators for the single-user messages;

if any of the RF condition indicators are below a performance threshold, then suspending further transmission of at least a portion of the multi-user messages in the series of repeating overhead time cycles and transmitting additional single-user messages in at least one of the overhead time cycles of the portion of multi-user messages;

and if none of the RF condition indicators are below the performance threshold, then continuing further transmission of the multi-user messages in the series of repeating overhead time cycles.

2. The method of claim 1, wherein the series of repeating overhead time cycles are wirelessly transmitted over a code division multiple access (CDMA) forward link control channel from the wireless access node.

3. The method of claim 2, wherein the multi-user messages further comprise CDMA access parameter messages (APM).

4. The method of claim 2, wherein the multi-user messages further comprise CDMA system parameter messages (SPM).

5. The method of claim 2, wherein the single-user messages further comprise extended channel assignment messages (ECAM).

6. The method of claim 1, wherein the series of repeating overhead time cycles are wirelessly transmitted over a long term evolution (LTE) forward link control channel from the wireless access node.

7. The method of claim 1, wherein the RF condition indicators comprise signal-to-noise information about the single-user messages as detected by the user devices, and wherein the performance threshold comprises a signal-to-noise threshold level.

8. The method of claim 1, further comprising: if further transmission of the multi-user messages in the series of repeating overhead time cycles has been suspended, then resuming transmission of the multi-user messages upon beginning a subsequent series of repeating overhead time cycles.

9. A wireless access node, comprising:
a transceiver configured to exchange overhead information with user devices in a series of repeating overhead time cycles, and wherein the overhead time cycles each comprise a multi-user message and a plurality of single-user messages;
the transceiver configured to transmit the multi-user messages comprising network parameters for receipt and use by all of the user devices;
the transceiver configured to transmit the single-user messages comprising paging messages for receipt and use by individual ones of the user devices;
in response to the single-user messages, the transceiver configured to transmit receive acknowledge messages comprising RF condition indicators for the single-user messages;
a processing system configured to process the RF condition indicators and a performance threshold;
wherein if any of the RF condition indicators are below the performance threshold, then the processing system is configured to command the transceiver to suspend further transmission of at least a portion of the multi-user messages in the series of repeating overhead time cycles and transmit additional single-user messages in at least one of the overhead time cycles of the portion of multi-user messages;
and wherein if none of the RF condition indicators are below the performance threshold, then the processing system is configured to command the transceiver to continue further transmission of the multi-user messages in the series of repeating overhead time cycles.

10. The wireless access node of claim 9, comprising: the transceiver configured to wirelessly transmit the series of repeating overhead time cycles over a code division multiple access (CDMA) forward link control channel from the wireless access node.

11. The wireless access node of claim 10, wherein the multi-user messages further comprise CDMA access parameter messages (APM).

12. The wireless access node of claim 10, wherein the multi-user messages further comprise CDMA system parameter messages (SPM).

13. The wireless access node of claim 10, wherein the single-user messages further comprise extended channel assignment messages (ECAM).

14. The wireless access node of claim 9, comprising: the transceiver configured to wirelessly transmit the series of repeating overhead time cycles over a long term evolution (LTE) forward link control channel from the wireless access node.

15. The wireless access node of claim 9, wherein the RF condition indicators comprise signal-to-noise information about the single-user messages as detected by the user devices, and wherein the performance threshold comprises a signal-to-noise threshold level.

16. The wireless access node of claim 9, comprising: wherein if the transceiver has been commanded to suspend further transmission of the multi-user messages in the series of repeating overhead time cycles, then the transceiver is configured to resume transmission of the multi-user messages upon beginning a subsequent series of repeating overhead time cycles.

* * * * *